United States Patent
White et al.

(10) Patent No.: US 12,465,075 B2
(45) Date of Patent: Nov. 11, 2025

(54) PARTICLES CONTAINING A LIPID MATRIX CORE AND ACTIVE INGREDIENT

(71) Applicant: Lonza Sales AG, Basel (CH)

(72) Inventors: Tyler White, Greenwood, SC (US); Christopher Craig, Greenwood, SC (US); David Vodak, Greenwood, SC (US); Shane Durkee, Greenwood, SC (US)

(73) Assignee: Lonza Sales AG, Basel (CH)

( * ) Notice: Subject to any disclaimer, the term of this patent is extended or adjusted under 35 U.S.C. 154(b) by 463 days.

(21) Appl. No.: 17/784,315

(22) PCT Filed: Dec. 10, 2020

(86) PCT No.: PCT/US2020/064237
§ 371 (c)(1),
(2) Date: Jun. 10, 2022

(87) PCT Pub. No.: WO2021/119271
PCT Pub. Date: Jun. 17, 2021

(65) Prior Publication Data
US 2022/0361552 A1 Nov. 17, 2022

Related U.S. Application Data

(60) Provisional application No. 62/946,107, filed on Dec. 10, 2019.

(51) Int. Cl.
| | |
|---|---|
| *A23P 10/35* | (2016.01) |
| *A23L 33/105* | (2016.01) |
| *A23L 33/155* | (2016.01) |
| *A61K 9/48* | (2006.01) |
| *A61K 9/50* | (2006.01) |
| *A61K 31/01* | (2006.01) |
| *A61K 31/07* | (2006.01) |
| *A61K 31/122* | (2006.01) |

(52) U.S. Cl.
CPC .............. *A23P 10/35* (2016.08); *A23L 33/105* (2016.08); *A23L 33/155* (2016.08); *A61K 9/4858* (2013.01); *A61K 9/5047* (2013.01); *A61K 9/5073* (2013.01); *A61K 9/5089* (2013.01); *A61K 31/01* (2013.01); *A61K 31/07* (2013.01); *A61K 31/122* (2013.01)

(58) Field of Classification Search
CPC ...... A23P 10/35; A23L 33/105; A23L 33/155; A61K 9/4858; A61K 9/5047; A61K 9/5073; A61K 9/5089; A61K 31/01; A61K 31/07; A61K 31/122
USPC .......................................................... 426/73
See application file for complete search history.

(56) References Cited

U.S. PATENT DOCUMENTS

| | | |
|---|---|---|
| 5,705,196 A | 1/1998 | Galan et al. |
| 5,731,006 A | 3/1998 | Akiyama et al. |
| 6,887,493 B2 | 5/2005 | Shefer et al. |
| 10,512,650 B2 | 12/2019 | Niichel |
| 11,504,330 B2 | 11/2022 | Vetter et al. |
| 2003/0148992 A1 | 8/2003 | Block et al. |
| 2007/0128272 A1* | 6/2007 | Zerbe ................ A23P 10/30 424/464 |
| 2010/0068276 A1 | 3/2010 | Friesen et al. |
| 2015/0328158 A1 | 11/2015 | Deshpande et al. |

FOREIGN PATENT DOCUMENTS

| | | | |
|---|---|---|---|
| JP | 2012035167 | 2/2012 | |
| WO | WO9420072 | 9/1994 | |
| WO | WO-2015173603 A1 * | 11/2015 | ........... A23L 33/10 |

OTHER PUBLICATIONS

International Search Report and Written Opinion for PCT/US2020/064237 dated Mar. 29, 2021, 11 pages.

* cited by examiner

*Primary Examiner* — Brent T O'Hern
(74) *Attorney, Agent, or Firm* — Dority & Manning, P.A.

(57) ABSTRACT

A composition containing a plurality of particles containing a core having a lipid matrix including an active ingredient dispersed therein is disclosed. The active ingredient can include a fat-soluble active ingredient. The particles can be contained in a capsule. Also provided are methods for producing a pharmaceutical composition containing a plurality of particles containing a core having a lipid matrix including an active ingredient dispersed therein.

12 Claims, No Drawings

PARTICLES CONTAINING A LIPID MATRIX CORE AND ACTIVE INGREDIENT

CROSS REFERENCE TO RELATED APPLICATIONS

This application claims priority to the benefit of U.S. Provisional Application No. 62/946,107, filed Dec. 10, 2019, and to the benefit of U.S. Patent Application No. PCT/US2020/064237, filed Dec. 10, 2020 which are both expressly incorporated herein by reference in their entirety.

BACKGROUND

Dietary and pharmaceutical formulations may contain multi-particulate materials that are coated with certain ingredients and incorporated into dosage forms. Indeed, these multi-particulates contain a starter particle or pellet, also known as seeds, beads, nonpareils, micro-granules, or starter cores. The cores are formed of inert material such as sucrose or microcrystalline cellulose. These cores are used as starter material and layered with active ingredient compounds before being incorporated into a final oral dosage formulation. However, incorporating certain active ingredients, such as fat-soluble ingredients, on starter cores can be very difficult. For example, certain fat-soluble actives must first be processed into a dry form and micronized down to finer particles to enable layering on the inert core. This can greatly reduce potency and create stability issues in the finished particulate product.

Accordingly, there exists a need for a multi-particulate material that can sufficiently incorporate therapeutically effective amounts of fat-soluble active ingredients that has suitable potency and shelf-stability.

SUMMARY

The present disclosure is generally directed to a composition containing a plurality of particles, wherein each of the particles includes a core containing a lipid matrix having an active ingredient dispersed therein. The active-ingredient may be a fat-soluble active ingredient. The particle can also include one or more outer layers disposed on the core. The one or more outer layers may also contain one or more active ingredients. In some embodiments, the outer layers containing one or more active ingredients may be layered on the core. The particles may be incorporated into a capsule or any other suitable oral dosage form. Also, disclosed are pharmaceutical compositions containing a capsule filled with one or more particles each containing a core having a lipid matrix containing an active ingredient dispersed therein and an outer layer disposed thereon having one or more active ingredients.

In some embodiments, the active ingredient is a fat-soluble ingredient such as one or more fat-soluble vitamins and minerals, one or more carotenoids, one or more cannabis extracts, coenzyme Q10, and combinations thereof. In certain embodiments, the fat-soluble ingredient includes a carotenoid, such as lutein, astaxanthin, zeaxanthin, alpha-carotene, beta-carotene, cryptoxanthin, lycopene, and mixtures thereof.

In some embodiments, the active ingredient may comprise about 10% to about 60% by weight of the core. In some embodiments, the cores may have a mean diameter ranging from about 40 µm to about 3000 µm. The cores can further contain an one or more outer layers having one or more active ingredients therein. For example, the cores can be coated with a suitable adhesive and layered with a second active ingredient. In some embodiments, the core may comprise from about 5% to about 60% by weight of the finished particle. In some embodiments, the one or more finished particles may have an average diameter of from about 0.5 mm to about 1.5 mm.

Additionally, disclosed are methods for producing a pharmaceutical composition that includes providing one or more cores comprising a lipid matrix having a fat-soluble active ingredient dispersed therein and layering the one or more cores with one or more active ingredient layers to form one or more particles.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to a composition containing a plurality of particles, wherein each of the particles includes a core containing a lipid matrix having an active ingredient dispersed therein. The active-ingredient may be a fat-soluble active ingredient. The plurality of particles may also include one or more outer layers disposed thereon. The one or more outer layers may include one or more active ingredients. The plurality of particles may be incorporated into a capsule or any other suitable oral dosage form. Also, disclosed are pharmaceutical compositions containing a capsule filled with one or more particles each containing a core having a lipid matrix containing an active ingredient dispersed therein. Various embodiments are disclosed herein.

The following description is exemplary in nature and is not intended to limit the scope, applicability or configuration of the invention in any way. Various changes to the described embodiments may be made in the function and arrangement of the elements described herein without departing from the scope of the disclosure.

As used in this application and in the claims, the singular forms "a," "an," and "the" include the plural forms unless the context clearly dictates otherwise. Additionally, the term "includes" means "comprises." The methods and compositions of the present disclosure, including components thereof, can comprise, consist of, or consist essentially of the essential elements and limitations of the embodiments described herein, as well as any additional or optional ingredients, components or limitations described herein or otherwise useful in nutritional compositions.

Unless otherwise indicated, all numbers expressing quantities of ingredients, properties such as molecular weight, percentages, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

As used herein, "optional" or "optionally" means that the subsequently described material, event or circumstance may or may not be present or occur, and that the description includes instances where the material, event or circumstance is present or occurs and instances in which it does not. As used herein, "w/w %" and "wt %" means by weight as a percentage of the total weight or relative to another component in the composition.

The term "about" is intended to mean approximately, in the region of, roughly, or around. When the term "about" is used in conjunction with a numerical range, it modifies that range by extending the boundaries above and below the numerical values set forth. Unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

The phrase "effective amount" means an amount of a compound that promotes, improves, stimulates, or encourages a response to the particular condition or disorder or the particular symptom of the condition or disorder.

The term "supplement" means a product in addition to the normal diet but may be combined with a mammal's normal food or drink composition. The supplement may be in any form but not limited to a solid, liquid, gel, capsule, or powder. A supplement may also be administered simultaneously with or as a component of a food composition which may comprise a food product, a beverage, a pet food, a snack, or a treat. In one embodiment, the beverage may be an activity drink.

As used herein, the term "flow point" is the temperature at which any portion of the mixture becomes sufficiently fluid that the mixture, as a whole, may be atomized. Generally, a mixture is sufficiently fluid for atomization when the viscosity of the molten mixture is less than 20,000 cp, or less than 15,000 cp, or less than 10,000 cp, less than 5000 cp, or even less than 1000 cp. The viscosity can be measured by controlled stress rheometer, which measures viscosity as a function of temperature, and may use either a shear-type or rotational rheometer. As used herein, melting point refers to the temperature that marks the midpoint of the transition from a solid crystalline or semi-crystalline state to a liquid state. As measured by DSC, the melting point is the temperature where upon heating the solid material, the maximum exothermic heat flow occurs. In general, melting point will be used in reference to relative pure single component materials such as some actives or essentially single component excipients (e.g. stearyl alcohol) and flow point will be used in reference to multi-component materials or mixtures.

The term "ambient temperature" refers to a temperature of 20° C.

As used herein, the term "semi-solid" is a solid at ambient temperature but becomes a liquid at temperatures above 30° C. or 40° C., or at body temperature.

Unless otherwise indicated, "capsule" means a container suitable for enclosing solids or liquids and includes empty capsule shells and components thereof such as caps and bodies that may be assembled together to form the capsule.

Unless otherwise indicated, "dosage form" refers to a solid composition comprising an active ingredient.

As used herein, the term "particle" refers a portion or quantity of material(s), such as a small portion or quantity of material(s). For example, as provided herein, the term particle may refer generally to a composition containing a core and one or more outer layers surrounding the core. In some embodiments, the particle(s) described may be generally spherical in shape. The term particle as used herein includes or may be used interchangeably with the following: pellet, beadlet, multiparticulates, particulates, spheres, seeds, etc. The term particle as used herein is not limited to only a particle formed by certain methods or processes. Indeed, the particle(s) described herein may be formed by any suitable process. Certain suitable processes include, but are not limited to, spheronization, extrusion, compression, powder layering, liquid layering, pelletization by melt and wet granulation, and combinations thereof. The particle(s) as described herein may be solid or semi-solid particles. In some embodiments, the particles describe herein can include both solid and semi-solid compositions contained on or within the particle itself.

Embodiments of the disclosed composition may include at least one active ingredient or active agent. The compositions may contain one or more active ingredients. As used herein, by "active" or "active ingredient" is meant a drug, medicament, pharmaceutical, therapeutic agent, nutraceutical, or other compound that may be desired to be administered to the body. The active ingredient may be a "small molecule," generally having a molecular weight of 2000 Daltons or less. The active ingredient may also be a "biological active." Biological active ingredients include proteins, antibodies, antibody fragments, peptides, oligonucleotides, vaccines, and various derivatives of such materials. In one embodiment, the active ingredient is a small molecule. In another embodiment, the active ingredient is a biological active. In still another embodiment, the active ingredient is a mixture of a small molecule and a biological active. Also as used herein, the terms "active ingredient", "first active ingredient", "second active ingredient", etc. may be used to denote active ingredients located in different places within the particle, such as those located in the core or those located in the one or more outer layers. However, the terms "first" or "second" do not necessarily denote that the first active ingredient is different from the second active ingredient. For example, in certain embodiments, the active ingredient contained within the core may be the same as the second active ingredient contained within an outer layer disposed on the core. While in certain other embodiments, the active ingredient contained within the core may be different from the second active ingredient contained within an outer layer disposed on the core.

In some embodiments the active ingredient may include a fat-soluble ingredient such as a fat-soluble vitamin or mineral. Examples of fat-soluble vitamins and minerals include vitamin A, vitamin D, vitamin E, vitamin K, CoEnzyme Q10, one or more carotenoids(beta-carotene, lutein, astaxanthin, lycopene, zeaxanthin), one or more cannabinoids, such as tetrahydrocannabinol, and combinations thereof.

In some embodiments, the active ingredient may include a carotenoid. Carotenoids, also known as tetraterpenoids, pertain to a class of compounds known as phytonutrients that can be found in a wide variety of plants, algae, and bacteria. Carotenoids also have an important antioxidant function of deactivating free radicals and can act as antioxidants within the human body. Carotenoids may also provide other health benefits when ingested including certain cancer-fighting properties and can contribute overall to eye and bone health. Carotenoids also are responsible for the bright red, yellow, and orange hues that are found in many fruits and vegetables.

Examples of carotenoids include lutein, astaxanthin, zeaxanthin, alpha-carotene, beta-carotene, cryptoxanthin, lycopene and mixtures thereof. Carotenoids include xanthophylls such as lutein and zeaxanthin, and carotenes, such as beta-carotene, alpha-carotene, zeto-carotene, and lycopene and related molecules, including 1-HO-3',4'-didehydrolycopene, 3, 1'-(HO)2-gamma-carotene, 1,1'-(HO)2-3, 4, 3',4'-tetradehydrolycopene, 1, 1'-(HO)2-3, 4-didehydrolycopene.

Other suitable carotenoid compounds which may be used as described herein include hydrocarbons, such as lycopersene (7,8,11,12,15,7',8',11',12',15'-decahydro-γ,γ-carotene), phytofluene, hexahydrolycopene (15-cis-7,8,11,12,7',8'-hexahydro-γ,γ-carotene), torulene (3',4'-didehydro-β,γ-carotene) and α-zeacarotene (7',8'-dihydro-ε,γ-carotene); alcohols, such as alloxanthin, cynthiaxanthin, pectenoxanthin, cryptomonaxanthin, ((3r,3'r)-7,8,7',8'-tetradehydro-β, β-carotene-3,3'-diol), crustaxanthin (β,-carotene-3,4,3',4'-tetrol), gazaniaxanthin ((3r)-5'-cis-β,γ-caroten-3-01), oh-chlorobactene (1',2'-dihydro-f,γ-caroten-1'-ol), loroxanthin (β,ε-carotene-3,19,3'-triol), lycoxanthin (γ,γ-caroten-16-ol), rhodopin (1,2-dihydro-γ,γ-caroten-1-ol), rhodopinol (aka warmingol; 13-cis-1,2-dihydro-γ,γ-caroten-1,20-diol), saproxanthin (3',4'-didehydro-1',2'-dihydro-β,γ-carotene-3,1'-diol) and zeaxanthin; glycosides, such as oscillaxanthin (2,2'-bis(β-l-rhamnopyranosyloxy)-3,4,3',4'-tetradehydro-1,2,1'2'-tetrahydro-γ,γ-carotene-1,1'-diol), and phleixanthophyll (1'-(β-d-glucopyranosyloxy)-3',4'-didehydro-1',2'-dihydro-β,γ-caroten-2'-ol); ethers, such as rhodovibrin (1'-methoxy-3',4'-didehydro-1,2,1',2'-tetrahydro-γ,γ-caroten-1-ol) and spheroidene (1-methoxy-3,4-didehydro-1,2,7',8'-tetrahydro-γ,γ-carotene), epoxides, such as diadinoxanthin (5,6-epoxy-7',8'-didehydro-5, 6-dihydro-carotene-3,3-diol), luteoxanthin (5,6: 5',8'-diepoxy-5,6,5',8'-tetrahydro-β,β-carotene-3,3'-diol), mutatoxanthin, citroxanthin, zeaxanthin (furanoxide 5,8-epoxy-5,8-dihydro-β,β-carotene-3,3'-diol), neochrome (5',8'-epoxy-6,7-didehydro-5,6,5',8'-tetrahydro-β,β-carotene-3,5,3'-triol), foliachrome, trollichrome, and vaucheriaxanthin (5',6'-epoxy-6,7-didehydro-5,6,5',6'-tetrahydro-β,β-carotene-3,5,19,3'-tetrol); aldehydes, such as rhodopinal, wamingone (13-cis-1-hydroxy-1,2-dihydro-γ,γ-caroten-20-al), torularhodinaldehyde (3',4'-didehydro-β,γ-caroten-16'-al); acids and acid esters, such as torularhodin (3',4'-didehydro-β,γ-caroten-16'-oic acid) and torularhodin methyl ester (methyl 3',4'-didehydro-β,γ-caroten-16'-oate); ketones, such as astaxanthin, canthaxanthin (aka aphanicin), chlorellaxanthin (β,β-carotene-4,4'-dione), capsanthin ((3r,3's,5'r)-3,3'-dihydroxy-β,κ-caroten-6'-one), capsorubin ((3s,5r,3's,5'r)-3,3'-dihydroxy-κ,κ-carotene-6,6'-dione), cryptocapsin ((3'r,5'r)-3'-hydroxy-β,κ-caroten-6'-one), 2,2'-diketospirilloxanthin (1,1'-dimethoxy-3,4,3',4'-tetrahydro-1,2,1'2'-tetrahydro-γ,γ-carotene-2,2'-dione), flexixanthin (3,1'-dihydroxy-3',4'-didehydro-1'2'-dihydro-β,γ-caroten-4-one), 3-oh-canthaxanthin (aka adonirubin; aka phoenicoxanthin; 3-hydroxy-β,β-carotene-4,4'-dione), hydroxyspheriodenone (1'-hydroxy-1-methoxy-3, 4-didehydro-1,2,1',2',7',8'-hexahydro-γ,γ-caroten-2-one), okenone (1'-methoxy-1'2'-dihydro-c,γ-caroten-4'-one), pectenolone (3,3'-dihydroxy-7',8'-didehydro-β,β-caroten-4-one), phoeniconone (aka dehydroadonirubin; 3-hydroxy-2,3-didehydro-β,β-carotene-4,4'-dione), phoenicopterone (β,ε-caroten-4-one), rubixanthone (3-hydroxy-β,γ-caroten-4'-one), siphonaxanthin (3,19,3'-trihydroxy-7,8-dihydro-β,ε-caroten-8-one); esters of alcohols, such as astacein (3,3'-bispalmitoyloxy-2,3,2',3'-tetradehydro-β,β-carotene-4,4'-dione or 3,3'-dihydroxy-2,3,2',3'-tetradehydro-β,β-carotene-4,4'-dione dipalmitate), fucoxanthin (3'-acetoxy-5,6-epoxy-3,5'-dihydroxy-6',7'-didehydro-5,6,7,8,5',6'-hexahydro-β,β-caroten-8-one), isofucoxanthin (3'-acetoxy-3,5,5'-trihydroxy-6',7'-didehydro-5,8,5',6'-tetrahydro-β,β-caroten-8-one), physalien, zeaxanthin dipalmitate ((3r,3'r)-3,3'-bispalmitoyloxy-β,β-carotene or (3r,3'r)-β,β-carotene-3,3'-diol dipalmitate) and siphonein (3,3'-dihydroxy-19-lauroyloxy-7,8-dihydro-β,ε-caroten-8-one or 3,19,3'-trihydroxy-7,8-dihydro-β,ε-caroten-8-one 19-laurate); apo carotenoids, such as β-apo-2'-carotenal (3',4'-didehydro-2'-apo-b-caroten-2'-al), apo-2-lycopenal, apo-6'-lycopenal (6'-apo-γ-caroten-6'-al), azafrinaldehyde (5,6-dihydroxy-5,6-dihydro-10'-apo-β-caroten-10'-al), bixin (6'-methyl hydrogen 9'-cis-6,6'-diapocarotene-6,6'-dioate), citranaxanthin (5',6'-dihydro-5'-apo-β-caroten-6'-one or 5',6'-dihydro-5'-apo-18'-nor-β-caroten-6'-one or 6'-methyl-6'-apo-β-caroten-6'-one), crocetin (8,8'-diapo-8,8'-carotenedioic acid), crocetinsemialdehyde (8'-oxo-8,8'-diapo-8-carotenoic acid), crocin (digentiobiosyl 8,8'-diapo-8,8'-carotenedioate), hopkinsiaxanthin (3-hydroxy-7,8-didehydro-7',8'-dihydro-7'-apo-b-carotene-4,8'-dione or 3-hydroxy-8'-methyl-7,8-didehydro-8'-apo-b-carotene-4,8'-dione), methyl apo-6'-lycopenoate (methyl 6'-apo-γ-caroten-6'-oate), paracentrone (3,5-dihydroxy-6,7-didehydro-5,6,7',8'-tetrahydro-7'-apo-b-caroten-8'-one or 3,5-dihydroxy-8'-methyl-6,7-didehydro-5,6-dihydro-8'-apo-b-caroten-8'-one) and sintaxanthin (7',8'-dihydro-7'-apo-b-caroten-8'-one or 8'-methyl-8'-apo-b-caroten-8'-one); nor and seco carotenoids, such as actinioerythrin (3,3'-bisacyloxy-2,2'-dinor-b,b-carotene-4,4'-dione), β-carotenone (5,6:5',6'-diseco-b,b-carotene-5,6,5',6'-tetrone), peridinin (3'-acetoxy-5,6-epoxy-3,5'-dihydroxy-6',7'-didehydro-5,6,5',6'-tetrahydro-12',13',20'-trinor-b,b-caroten-19,11-olide), pyrrhoxanthininol (5,6-epoxy-3,3'-dihydroxy-7',8'-didehydro-5,6-dihydro-12',13',20'-trinor-b,b-caroten-19,11-olide), semi-α-carotenone (5,6-seco-b,e-carotene-5,6-dione), semi-β-carotenone (5,6-seco-b,b-carotene-5,6-dione or 5',6'-seco-b,b-carotene-5',6'-dione) and triphasiaxanthin (3-hydroxysemi-b-carotenone 3'-hydroxy-5,6-seco-b,b-carotene-5,6-dione or 3-hydroxy-5',6'-seco-b,b-carotene-5',6'-dione); retro carotenoids and retro apo carotenoids, such as eschscholtzxanthin (4',5'-didehydro-4,5'-retro-b,b-carotene-3,3'-diol), eschscholtzxanthone (3'-hydroxy-4',5'-didehydro-4,5'-retro-b,b-caroten-3-one), rhodoxanthin (4',5'-didehydro-4,5'-retro-b,b-carotene-3,3'-dione) and tangeraxanthin (3-hydroxy-5'-methyl-4,5'-retro-5'-apo-b-caroten-5'-one or 3-hydroxy-4,5'-retro-5'-apo-b-caroten-5'-one); and higher carotenoids, such as nonaprenoxanthin (2-(4-hydroxy-3-methyl-2-butenyl)-7',8',11',12'-tetrahydro-e,γ-carotene), decaprenoxanthin (2,2'-bis(4-hydroxy-3-methyl-2-butenyl)-e,e-carotene), c.p. 450 (2-[4-hydroxy-3-(hydroxymethyl)-2-butenyl]-2'-(3-methyl-2-butenyl)-b,b-carotene), c.p. 473 (2'-(4-hydroxy-3-methyl-2-butenyl)-2-(3-methyl-2-butenyl)-3',4'-didehydro-1',2'-dihydro-b,γ-caroten-1'-ol) and bacterioruberin (2,2'-bis(3-hydroxy-3-methylbutyl)-3,4,3',4'-tetradehydro-1,2,1',2'-tetrahydro-γ,γ-carotene-1,1'-dio).

Carotenoid compounds for use as described herein may be natural i.e. obtained from a natural source, for example, extracted from a plant, such as a tomato, melon, or marigold, etc. A range of methods for extracting, concentrating and/or purifying carotenoids from plants are known in the art. For example, solvent extraction using ethanol, DMSO, ethyl acetate, hexane, acetone, soya or other vegetable oil, or non-vegetable oils may be employed. A carotenoid compound may be isolated free, or substantially free, of other molecules found in its natural source or environment. The use of such extraction and purification methods are known to individuals appropriately skilled in the art.

Carotenoid compounds for use as described herein may be synthetic i.e. produced by artificial means, for example, by chemical synthesis or fermentation. A range of methods for chemical synthesis of carotenoids are known in the art.

In some embodiments, the carotenoid is obtained as an oil, typically an extract from a natural product, and may contain a variety of components. Those components that are structurally and functionally similar to lutein, astaxanthin and zeaxanthin are considered active ingredients.

In one embodiment, the carotenoid included in the composition, such as the nutritional supplement, comprises a carotenoid that is metabolized into Vitamin A, such as retinal, retinol, or retinoic acid in a body. Such carotenoids may be considered Vitamin A precursors. Examples of such carotenoids include beta-carotene, alpha-carotene, gamma-carotene, and beta-cryptoxanthin.

In an alternative embodiment, the carotenoid contained in the composition may comprise a carotenoid with antioxidant activities. Such carotenoids include lutein, zeaxanthin, lycopene, crocetin, and so on.

Carotenoids can exhibit certain stability and dosage complications when they are formulated into oral formulations. For example, given the bright colored hues of many of carotenoid compounds, they tend to discolor resulting dosage formulations, which can be off-putting to consumers. Furthermore, carotenoids are susceptible to degradation, thus, it is difficult to use them in coatings in multiparticulate dosage forms. Such degradation can result in lowered potency in the final dosage formulation. However, as provided herein, the core can contain a lipid matrix having a fat-soluble active ingredient, such as a carotenoid, dispersed therein. Thus, the carotenoid can be included in the core in sufficient amounts to address any potency concerns. Furthermore, as the core is coated with additional layers, the carotenoid is protected from further degradation during storage and shipping. Additionally, given that the core may be coated, this prevents the carotenoid composition from bleeding or dyeing the resultant oral dosage formulation. Thus, formulating the core of the present disclosure with a sufficient amount of carotenoid can address potential potency, shelf-stability, and product quality issues.

In some embodiments, the active ingredient is crystalline in the compositions. In other embodiments, the active ingredient is non-crystalline in the compositions. In still another embodiment, the active ingredient may comprise crystalline and non-crystalline regions in the compositions. In some embodiments, the active ingredient is at least 60 wt % crystalline. In other embodiments, the active ingredient is at least 75 wt % crystalline. In another embodiment, the active ingredient is at least 90 wt % crystalline. In other embodiments, the active ingredient may dissolve into certain excipients of the lipid matrix prior to forming the core. During formation of the core, a portion of the crystalline active ingredient may dissolve into the molten mixture up to the active ingredient's solubility limit in the molten mixture at the processing conditions. When the molten mixture is cooled to form the multiparticulate cores, the multiparticulate cores will comprise particles of crystalline active ingredient encapsulated in a solid solution of lipid matrix and the dissolved active ingredient.

In certain embodiments, the active ingredient may contain one or more cannabis extracts. As used herein, "cannabis" may refer to any variety of the Cannabis plant, such as *Cannabis sativa* or *Cannabis indica*, for instance. More particularly, the present disclosure may refer to leaves, stems, seeds and flowers or any other part of the Cannabis plant, as cannabis. Nonetheless, cannabis, as referred to herein, includes cannabis that contains average or high levels of THC and/or CBD (usually known as marijuana), hemp, which may contain low, or very low, levels of THC, industrial hemp, which may refer to a cannabis plant that contains less than 0.3% THC, or combinations thereof.

"Cannabinoids" are a group of compounds including the endocannabinoids, the phytocannabinoids and those which are neither endocannabinoids or phytocannabinoids, hereafter "syntho-cannabinoids".

"Endocannabinoids" are endogenous cannabinoids, which are high affinity ligands of CB1 and CB2 receptors.

"Phytocannabinoids" are cannabinoids that originate in nature and can be found in the cannabis plant. The phytocannabinoids can be present in an extract including a botanical drug substance, isolated, or reproduced synthetically.

"Syntho-cannabinoids" are those compounds capable of interacting with the cannabinoid receptors (CB1 and/or CB2) but are not found endogenously or in the cannabis plant. Examples include WIN 55212 and rimonabant.

A "synthetic cannabinoid" is one which has been produced by chemical synthesis this term includes modifying an isolated phytocannabinoid, by for example forming a pharmaceutically acceptable salt thereof.

The active ingredient in accordance with the present disclosure may contain one or more cannabinoids. Cannabinoids, for instance, can be obtained from cannabis. Cannabis, or the cannabis plant, may refer to both marijuana, which is generally used for recreational purposes, and hemp, which is generally used in industrial applications. Cannabis is a green and/or brown mixture of dried, shredded leaves, stems, stalks, seeds and flowers of the plant, and may reference leaves, stems, seeds, and flowers from a Cannabis plant, varieties of which include *Cannabis sativa* or *Cannabis indica*. Hemp (and particularly the industrial hemp variety), have a very similar appearance to marijuana, but unlike the cannabis plant variety referred to by marijuana, hemp generally only contains low amounts of tetrahydrocannabinol (THC), where both hemp and marijuana can include high amounts of cannabidiol (CBD). For instance, hemp, and particularly industrial hemp may contain less than about 0.3% THC where the cannabis variety referred to by marijuana may contain anywhere from 5% to 30% THC. Recently, over 25 states in the United States have legalized the use of cannabis for at least medical purposes. In addition, Canada has now legalized the use of cannabis for medical and recreational use. In view of these recent developments, the commercialization of cannabis has dramatically increased.

In addition to THC, cannabis also can contain cannabidiol (CBD). Although CBD does interact with pain receptors in the brain, CBD does not create the same euphoric feeling caused by THC. CBD, however, exerts pain-relieving and anti-inflammatory effects. Cannabis, and especially CBD, do not have the same addictive effect as many opioids.

Cannabinoids that may be incorporated into the compositions of the present disclosure include endocannabinoids, phytocannabinoids and syntho-cannabinoids. In one embodiment, for instance, one or more cannabinoids incorporated into the product include phytocannabinoids that are extracted from plants, such as cannabis.

In certain embodiments, the lipid matrix of the core may be formulated such that the core contains from about 10% to about 60% by weight of the active ingredient. For example, in certain embodiments, the core may contain at least about 15% by weight of the active ingredient, such as at least about 20% by weight, such as at least about 25% by weight, such as at least about 30% by weight, such as at least about 35% by weight, such as at least about 40% by weight, such as at least about 45% by weight, such as at least about 50% by weight, such as about 60% or less.

In some embodiments, the active ingredient may include any suitable water-soluble vitamin or mineral. Suitable water-soluble vitamins and minerals can include the B-complex vitamins, such as vitamin B1 (thiamine), vitamin B2 (riboflavin), vitamin B3 (niacin), vitamin B5 (pantothenic acid), vitamin B6 (pyridoxine, pyridoxal, and pyridoxamine), vitamin B7 (biotin), vitamin B9, vitamin B12 (cobalamin), and mixtures thereof. Other suitable water-soluble vitamins include vitamin C.

In certain embodiments, the active ingredient may be selected from the following: choline, calcium, chloride, chromium, copper, fluoride, iodine, iron, magnesium, manganese, molybdenum, phosphorus, potassium, selenium, sodium, sulfur, zinc, and combinations thereof. In certain embodiments, the active ingredient may include any suitable vitamin, mineral, plant extract, herbal extract, dietary supplement, including synthetic dietary supplements, active pharmaceutical ingredients, powders containing suitable active ingredients, and combinations thereof. Exemplary, and not limiting active ingredients include vitamins and minerals which include (but not limited to) magnesium, vitamin C, B vitamins—riboflavin, pyridoxine HCl, methylcobalamin, folic acid, calcium pantothenate, iron, chromium, potassium, iodine and other similar ingredients.

In certain embodiments, the core of the one or more particles disclosed herein may contain a fat-soluble active ingredient and the active ingredient layer may contain one or more active ingredients that can either be fat-soluble or water-soluble. In some embodiments, the core and the active ingredient layer may contain the same active ingredient, while in other embodiments the active ingredient in the core may be the same or different from the active ingredients contained in the active ingredient layers disposed on the outer surface of the core.

The one or more cores as described herein may include a lipid matrix. U.S. patent publication no. 2018/0125863, incorporated by reference herein in its entirety, described certain oral formulations containing an active ingredient incorporated with a lipid matrix. Accordingly, in certain embodiments the cores containing the lipid matrix may be formulated according to the example embodiments provided un U.S. patent publication no. 20018/0125863.

In certain embodiments, the lipid matrix of the core may include a) at least one low flow point excipient, b) at least one high flow point excipient, c) at least one low-flow point surfactant, and c) optionally an antioxidant.

The cores disclosed herein may include a lipid matrix that contains a low-flow point excipient. For example, in certain embodiments the lipid matrix may contain one or more low-flow point excipients. Low flow point excipients generally include fatty alcohols, fatty acids, fatty acid esters of glycols and poly glycols, fatty acid esters of polyglycerol and fatty acid esters of glycerol (glycerides) with flow points of less than 50° C. When the low flow point excipient is a relatively pure material, the melting point is also less than 50° C. A preferred class of low flow point excipients are low flow point glycerides. By "low flow point" excipient, such as a glyceride, is meant that the melting point of the excipient, such as a glyceride, is less than 50° C. In some embodiments, the low flow point glyceride has a melting point of less than 40° C. In some embodiments, the low-flow point excipient, such as glyceride, is a mixture of compounds, having a flow point of 50° C. or less. In some embodiments, the low-flow point excipient, such as glyceride, has a flow point of 40° C. or less. In some embodiments, the low-flow point glyceride has a low flow point of 30° C. or less. Exemplary low flow point glycerides include polyglycolized glycerides, such as some of the Gelucire products manufactured by Gattefosse, such as Gelucire® 43/01 having a nominal melting point of 43° C. Mixtures of low flow point glycerides are also effective, such as mixtures of Gelucire® 43/01 (C10-C18 triglycerides), Gelucire® 50/13 (stearoyl polyoxylglycerides), Gelucire® 44/14 (lauroyl macrogol-32 glycerides), and mixtures thereof. Other glycerides may also be used, such as fatty acid esters of glycols and poly glycols, and fatty acid esters of polyglycerols.

A function of the low flow point excipient is to ensure that at least a significant portion of the formulation matrix softens when ingested orally by a patient in need of therapy, at the temperature of the GI tract (about 37 for humans). This allows the formulation to break down by digestion in the gastro-intestinal (GI) tract, and ultimately to disperse in the GI tract to promote dissolution and absorption of the active. In certain embodiments the low flow point excipient provides a significant portion of the formulation matrix to be present in a non-crystalline liquid or amorphous state when ingested and softened in the GI tract.

Exemplary low flow point fatty alcohols include myristyl alcohol (Tm 38° C.), lauryl alcohol (Tm 23° C.) and capric alcohol (Tm 7° C.).

Exemplary low flow point fatty acids include lauric acid (Tm 44° C.) and oleic acid (Tm 16° C.).

In certain embodiments, the cores may include a lipid matrix including a high-flow point excipient. For example, in certain embodiments the lipid matrix may contain one or more high-flow point excipients. By "high flow point" excipient is meant an excipient that has a flow point 50° C. or more. High flow point excipients may also have a melting point above 50° C. High flow point excipients generally include fatty alcohols, fatty acids, fatty acid esters of glycols and poly glycols, fatty acid esters of polyglycerol, fatty acid esters of glycerol (glycerides), waxes, polar waxes and other materials with flow points of greater than 50. A preferred class of high flow point excipients are "high flow point glycerides". By high flow point glyceride is meant that the flow point or melting point of the glyceride is 50° C. or more. In some embodiments, the high flow point glyceride has a melting point of 60° C. or more. In some embodiments, the high-melting point glyceride is a mixture of compounds, having a flow point of 50° C. or more. In some embodiments, the high-flow point glyceride has a flow point of 60° C. or more. In some embodiments, the high flow point glyceride has a flow point of 70° C. or more.

Exemplary high flow point glycerides include glycerol behenate, glycerol dibehenate, glycerol palmitate, hydrogenated castor oil, and mixtures thereof.

Often, the high flow point glyceride is a mixture of compounds that are formulated into a product and sold under a variety of trade names.

Exemplary high flow point and high melt point fatty alcohols include stearyl alcohol (Tm 58° C.) and behenyl alcohol (Tm 71° C.).

Exemplary high flow point and high melt point fatty acids include palm itic acid (Tm 63° C.) and stearic acid (Tm>70° C.).

Exemplary waxes include paraffin wax, beeswax, candelilla wax, carnauba wax, and mixtures thereof.

A function of the high flow point excipient is to aid in the manufacturability of the cores by enabling the cores to congeal at a lower temperature to obtain solid particles during the melt-spray-congeal processing. In certain embodiments the high flow point excipient aids the physical stability of the core formulation. In most embodiments, the high flow point excipient is not appreciably digested in the GI tract.

In some embodiments, the cores or the lipid matrix of the cores may include other excipients to improve the performance and chemical stability of the formulations. In some embodiments, a dispersing agent is included in the core. Exemplary dispersing agents include lecithin, glycerin monostearate, ethylene glycol palmitostearate, aluminum oxide, polyethylene alky ethers, sorbitan esters, and mixtures thereof. In one embodiment, the cores include an antioxidant to maintain chemical stability of the active agent. Exemplary antioxidants include vitamin E, tocopheryl polyethylene glycol succinate (TPGS), rosemary extract, ascorbic acid, asorbyl palmitate, butylated hydroxyanisole (BHA), buytlated hydroxytoluene (BHT), and mixtures and combinations thereof.

In some embodiments, a flow aid is used to improve the flow properties of the cores. Exemplary flow aids also known as glidants include calcium silicate, cab-o-sil, silicon dioxide, calcium phosphate tribasic, colloidal silicone dioxide, magnesium silicate, magnesium trisilicate, starch, talc, and other flow aids.

The cores described herein are generally a plurality of particles or beadlets that are solid at ambient temperature and are generally spherical in shape. By generally spherical is meant that while most particles are essentially spherical, they do not necessarily form "perfect" spheres. Such particle variations in spherical shapes are known to those persons of ordinary skill in the art of melt-spray-congeal processing and similar particulate forming methods.

The cores may have a size ranging from a mean diameter of about 40 μm to about 3000 μm, such as from about 50 μm to about 2500 μm, such as from about 80 μm to about 2000 μm, such as from about 100 μm to about 1500 μm, such as from about 200 μm to about 1000 μm, such as from about 300 μm to about 800 μm. To measure the diameters of the particulates, there are several methods that can be used, including laser diffraction, optical microscopy, and/or SEM.

Furthermore, in one aspect, the core may form about 1% to about 70% by weight of the particle, such as about 5% to about 60%, such as about 10% to about 50%, such as about 20% to about 40% by weight of the particle, or any ranges or values therebetween.

In certain embodiments, the cores containing the active ingredient and lipid matrix have a flow point above 25° C., such as above 30° C., such as above 35° C., such as above 40° C.

In one embodiment, the lipid matrix may contain fatty alcohols, fatty acids, fatty acid esters of glycerol, glycols and poly glycols, fatty acid esters of polyglycerol, polyglycolized glycerides, C8-C18 triglycerides, stearoyl polyoxylglycerides, lauroyl macrogol-32 glycerides, caprylocaproyl macrogol-8 glycerides, oleoyl macrogol-6 glycerides, linoleoyl macrogol-6 glycerides, myristyl alcohol, lauryl alcohol, capric alcohol, glycerol behenate, glycerol dibehenate, glycerol palmitate, hydrogenated castor oil, stearyl alcohol, behenyl alcohol, palmitic acid, stearic acid, paraffin wax, beeswax, candelilla wax, carnauba wax, polyethoxylated 12-hydroxysteric acid, propylene glycol monocaprylate esters, propylene glycol dicaprate/dicaprylate esters, propylene glycol heptanoate, propylene glycol monostearate, propoylene glycol monooleate, propylene glycol monopalmitate, propylene glycol monomyristate, esterified alpha-tocopheryl polyethylene glycol succinate, propylene glycol monolaurate esters, polyoxyl 35 castor oil, polyoxyl 40 hydrogenated castor oil, lecithins, such as sunflower lecithin, vitamin E, tocopheryl polyethylene glycol succinate (TPGS), sugar fatty acid esters, sorbitan fatty acid esters, polyoxyethylene sorbitan fatty acid esters, polyoxyethylene-polyoxypropylene copolymers, propylene glycol, triacetin, isorpropyl myristate, diethylene glycol monoethyl ether, polyethylene glycol, glycerol, rosemary extract, ascorbic acid, ascorbyl palmitate, butylated hydroxyanisole (BHA), butylated hydroxytoluene (BHT), and mixtures and combinations thereof.

In one embodiment, the lipid matrix composition comprises greater than 50 wt % of the low flow point excipient. In one embodiment, the lipid matrix composition comprises at least 2 wt % of the high flow point excipient. In another embodiment, the lipid matrix composition comprises less than 30 wt % of the high flow point excipient. In another embodiment the mass ratio of the low flow excipient to the high flow excipient is at least 20:1. In still another embodiment, the mass ratio of the low flow excipient to the high flow excipient is at least 15:1. In another embodiment, the mass ratio of the low flow excipient to the high flow excipient is at least 10:1. In another embodiment, the mass ratio of the low flow excipient to the high flow excipient is at least 4:1. In another embodiment, the mass ratio of the low flow excipient to the high flow excipient is at least 3:1. In another embodiment, the mass ratio of the low flow excipient to the high flow excipient is at least 2:1.

In some embodiments, the active ingredient is contained within a lipid matrix containing stearyl alcohol, stearic acid, candelilla wax, and lecithin. In certain embodiments the lipid matrix may contain from about 40% about 60% by weight of the active ingredient, such as about 50% by weight of the active ingredient. In certain embodiments, the lipid matrix may contain from about 15% to about 25% by weight of stearyl alcohol, such as about 17% by weight of stearyl alcohol. In some embodiments, the lipid matrix may contain from about 10% to about 20% by weight of stearic acid, such as from about 15% by weight of stearic acid. In some embodiments, the lipid matrix may contain from about 10% to about 20% of a suitable wax, such as candelilla wax, such as from about 15% by weight of a suitable wax. In some embodiments, the lipid matrix may contain from about 1% to about 3% of a lecithin, such as about 2% of a lecithin, such as soy lecithin.

In certain embodiments, the lipid matrix containing the active ingredient may be formed and then formulated into one or more particles having a generally spherical shape and a mean diameter ranging from about ranging from 40 μm to 3000 μm, such as from about 100 μm to 2000 μm, such as from about 300 μm to 1000 μm.

In one embodiment, the lipid matrix is comprised of at least 10 wt % to 50 wt % of the low flow point excipient. In another embodiment, the lipid matrix is comprised of at least 50 wt % to 75 wt % of the low flow point excipient.

In one embodiment, the lipid matrix comprises at least 2 wt % of the high flow point excipient. In another embodiment, the lipid matrix is comprised of 1 wt % to 30 wt % of the high flow point excipient. In still another embodiment, the lipid matrix is comprised of 2 wt % to 20 wt % of the high flow point excipient. In still another embodiment, the lipid matrix is comprised of 3 wt % to 15 wt % of the high flow point excipient.

The lipid matrix may also comprise a dispersing agent. In one embodiment, the lipid matrix is comprised of from 0 wt % to 20 wt %, such as from 0.01 wt % to 20 wt %, of a dispersing agent. In another embodiment, the lipid matrix is comprised of from 2 wt % to 10 wt % of a dispersing agent.

The lipid matrix may also comprise an antioxidant. In one embodiment, the lipid matrix comprise from 0 wt % to 20 wt %, such as from 0.01 wt % to 20 wt %, of an antioxidant. In one embodiment, the lipid matrix comprise from 1 wt % to 15 wt % of an antioxidant.

The lipid matrix may also comprise a flow aid. In one embodiment, the lipid matrix may comprise from 0 wt % to 5 wt %, such as from 0.01 wt % to 5 wt %, of a flow aid. In another embodiment, the lipid matrix may comprise from 0.5 wt % to 2 wt % of a flow aid.

The cores containing the lipid matrix described herein may be formulated by any suitable process. In some embodiments, the cores may be formulated by a suitable melt-spray-congeal process. Exemplary processes include "melt-spray-congeal" processes, such as those described in U.S. Pat. Nos. 7,235,260, 7,887,844, EP1691787, and U.S. Pat. No. 7,625,507.

A molten mixture is formed by mixing and heating the lipid matrix compositions as previously described. Such compositions may include an active ingredient, a low flow point excipient, and a high flow point excipient. "Molten mixture" means that the mixture of an active ingredient and lipid matrix materials are sufficiently mixed and heated to fluidize the mixture sufficiently to allow it to be atomized into droplets. Generally, the mixture is molten in the sense that it will flow when subjected to one or more forces such as pressure, shear, and centrifugal force, such as that exerted by a centrifugal or spinning-disk atomizer.

Once the molten mixture has been formed, it is delivered to an atomizer that breaks the molten mixture into small droplets. Virtually any method can be used to deliver the molten mixture to the atomizer. In certain embodiments of the disclosed methods the molten mixture is delivered to the atomizer by use of pumps and/or various types of pneumatic devices such as pressurized vessels or piston pots or extruder. In certain embodiments the molten mixture is maintained at an elevated temperature during delivery to the atomizer to prevent its solidification and to keep it in a flowable state.

When a centrifugal atomizer (also known as rotary atomizers or spinning-disk atomizer) is used, the molten mixture is fed onto a rotating surface, where it spreads outward and flows by centrifugal force. The rotating surface may take several forms, examples of which include a flat disk, a cup, a vanned disk, and a slotted wheel. The surface of the disk may also be heated to aid in atomization of the molten mixture or cooled to aid in the solidification of the cores containing the lipid matrix. Several mechanisms of atomization are observed with flat-disk and cup centrifugal atomizers, depending on the flow of molten mixture to the disk, the rotation speed of the disk, the diameter of the disk, the viscosity of the feed, and the surface tension and density of the feed. At low flow rates, the molten mixture spreads out across the surface of the disk and when it reaches the edge of the disk, forms a discrete droplet, which is then flung from the disk.

Once the molten mixture has been atomized, the droplets are congealed, typically by contact with a gas at a temperature below the solidification temperature of the composition. Typically, it is desirable that the droplets are congealed in less than 60 seconds, less than 10 seconds, or even in less than 1 second. In certain embodiments congealing at ambient temperature using an ambient temperature cooling medium, results in sufficiently rapid solidification of the droplets. However, as certain embodiments of the disclosed compositions are comprised of at least 50 wt % of a low flow point excipient, it is often preferred to utilize a cooling medium that is at a temperature that is at least 10° C. below ambient temperature. For some embodiments, it is preferred to utilize a cooling medium that is at least 20° C. below ambient temperature.

In certain embodiments, the cores disclosed herein may be subjected to additional processing in order to deposit one or more layers of active ingredient material on the cores disclosed herein. For example, the cores described herein may contain one or more outer layers disposed on the core that include at least one second active ingredient. Further, the one or more outer layers disposed on the core can include an adhesive in addition to one or more active ingredients. For example, to provide the outer layer disposed on the core, the core can be coated with suitable adhesives and then further coated with active ingredients in order to provide a particle having one or more outer layers including one or more active ingredients surrounding the core.

In certain embodiments, the one or more particles may be subjected to any suitable coating process for edible tablets or particles in order to apply an active ingredient to the core or to the particles disclosed herein. Suitable processes may include those know generally as the Wurster process. Wurster processes are known in the art and may be synonymous with certain fluid bed microencapsulation processes. Descriptions of Wurster processes are disclosed in U.S. Pat. Nos. 2,648,609 and 3,241,520. Generally, during the Wurster process, the cores or particles are placed in a bed, such as a fluidized bed. The fluidized bed uses differential air flow to create a cyclic movement of the particle material. The one or more cores can be placed in the particulate bed and different air streams can move the bed of particulate material (i.e. the cores) as they are coated with a material, such as a suitable adhesive or active ingredient material, in order to coat the core structure. Generally, the process can be continued until the desired thickness of active ingredient layer is achieved on the core. The particles disclosed herein may be subjected to a suitable Wurster process in order to provide one or more active ingredient layers to the particle. In some embodiments, the cores or particles disclosed herein may be coated via any suitable fluid bed coating process.

In some embodiments, the cores and/or particles may be coated via any known drum coating process. Generally, a drum coating process refers to a method for coating particles via placing the particles inside a rotating drum and applying the desired coating material to the particle while rotating the particles within the drum. Devices suitable for drum coating particles are known and include those described in U.S. patent publication no. 2015/0144058. In certain embodiments the cores disclosed herein may be placed in any suitable drum coating device and an adhesive can be applied to the cores or particles. Once sufficiently coated with the adhesive, an active ingredient can then be applied to the cores or particles in the drum to create an active ingredient layer on the cores or particles. This process of applying a suitable adhesive and active ingredient can be repeated as many times as necessary in order to produce the desired number of active ingredient layers on the particles. In certain embodiments, the adhesive may be applied to the core or particle directly with one or more active ingredients.

In certain embodiments, the cores or particles may be coated with a suitable adhesive. Suitable adhesives may include pharmaceutical grade shellacs such as pharmaceutical glaze, which is an alcohol-based solution that can include various types of food-grade shellac. In certain embodiment, the pharmaceutical glaze may contain from about 20% by weight to about 51% by weight of shellac in an ethyl alcohol solution. The pharmaceutical glaze may further contain additional additives such as waxes, titanium dioxide, and combinations thereof. In certain embodiments, the pharmaceutical glaze utilized according to embodiments herein is certified as generally recognized as safe (GRAS) by the U.S. Food and Drug Administration (FDA). In certain embodiments, the adhesive may include a suitable non-animal-based product, such as zein. Zein generally refers to a class of prolamine protein found in corn that can be manufactured as an adhesive coating or binder.

Accordingly, in some embodiments, the outer surface of the cores described herein are coated with a sufficient amount of a suitable adhesive to enable binding of the active ingredient to the outer surface of the core. Generally, the adhesive can be applied such that outer surface of the core becomes tacky or sticky, but is not so tacky such that the cores or particles agglomerate together. Once the adhesive is applied, an active ingredient can be applied to the particle to create an active ingredient layer thereon. In some embodiments, the process of layering the particle with an adhesive layer and layering the particle with an active ingredient can be repeated as many times as desired in order to form a particle having a desired amount of active ingredient layers. For example, the particles disclosed herein may include a core having at least one outer layer thereon containing at least one active ingredient, such as at least two outer layers, such as at least three outer layers, such as at least four outer layers, such as at least five outer layers, such as at least six outer layers, etc. In certain embodiments, each of the outer layers may include one or more active ingredients. In some embodiments, one or more of the outer layers may include the same active ingredient or a different active ingredient from the active ingredient(s) contained within the core. In certain embodiments, the particle may contain one or more outer layers that do not contain an additional active ingredient. For example, the particle may contain one or more outer layers comprised of a suitable coating material for sealing the particle or for providing a particular release profile, such as time release or release by a certain pH upon ingestion. Exemplary outer coating materials include, for example ethylcellulose, shellac, zein, HPMC and other similar components.

In some embodiments, the one or more particles provided herein may be formulated into any suitable dosage formulation. For example, in certain embodiments, the one or more particles provided herein may be placed into a capsule for delivery by oral ingestion. Exemplary capsules include hard gelatin capsules, soft gelatin capsules, HPMC capsules, as well as capsules made from other materials. The one or more particles may be suspended in an aqueous-based matrix or an oil-based matrix within the capsule itself. In certain embodiments where the particles are suspended in an aqueous-based matrix or an oil-based matrix, the aqueous-based matrix or oil-based matrix may additional include one or more active ingredients. In certain embodiments, the one or more particles may be contained within a monolithic enteric capsule suitable for providing a modified release profile when ingested.

Capsules normally consist of a shell filled with one or more specific substances. The shell itself may be a soft or a hard capsule shell. Hard capsule shells are generally manufactured using dip molding processes, which can be distinguished into two alternative procedures. In the first procedure, capsules are prepared by dipping stainless-steel mold pins into a solution of polymer, optionally containing one or more gelling agents (e.g. carrageenans) and co-gelling agents (e.g. inorganic cations). The mold pins are subsequently removed, inverted, and dried to form a film on the surface. The dried capsule films are then removed from the molds, cut to the desired length, and then the telescoping fit caps and bodies are assembled together, printed, and packaged. See, e.g., U.S. Pat. Nos. 5,264,223, 5,756,123, and 5,756,123. In the second procedure, no gelling agents or co-gelling agents are used and film-forming polymer solution gelification on the molding pins is thermally induced by dipping pre-heated molding pins into the polymer solution. This second process is commonly referred to as thermogellation, or thermogelling dip molding. See, e.g., EP 0401832, U.S. Pat. Nos. 3,493,407, 4,001,211, and 3,617,588, GB 1310697, and WO 2008/050209. The aforementioned manufacturing processes involve the use of solutions of the different ingredients that are needed for the making the telescoping fit hard capsule shells.

Hard capsules may be filled with active ingredients, such as the particles described herein, via procedures known in the art. Typically, active ingredients are combined with various compatible excipients for ease of fill. The resulting fill may be a dry powder, a granulation, particles, lipid particles, a suspension, or a liquid. Additionally, stable, filled hard capsules have advantages over other dosage delivery forms such as liquids and solid tablets. Certain active ingredients may be difficult to formulate into dry granules or may be otherwise incompatible with the tableting process. Another consideration is improved patient compliance for taste-masking and ease of swallowing, i.e., capsules being preferred by consumers over tablets. For example, in some embodiments, provided is a pharmaceutical composition that contains a capsule filled with the one or more particles disclosed herein. In some embodiments, the one or more particles have not been enterically coated for modified release or gastric protection.

In certain other embodiments, the one or more particles can be administered orally as a solid, liquid, suspension, or gas. The composition of particles may be administered via buccal or sublingual administration. In one embodiment, the one or more particles may be administered as a capsule, tablet, caplet, pill, troche, drop, lozenge, powder, granule, syrup, tea, drink, thin film, seed, paste, herb, botanical, and the like. In addition to being administered orally, the one or more particles can also be administered using other routes including intranasal, intravenous, intramuscular, intragastric, and the like.

EXAMPLES

Example 1: Multivitamin Beadlets with Fat Soluble Vitamins in Lipid Multiparticulate (LMP) Core A beadlet is made using pan coating process, where the starter core contains fat soluble vitamins provided in the form of an LMP particle. The LMP particle contains Vitamin E (as d-alpha tocopherol in a 20% solution) 7.5% by weight of the LMP, Vitamin K2 (as menaquinone 7) 0.5% by weight of the LMP and Vitamin A (as Beta Carotene in a 30% solution) 15% by weight of the LMP with the remainder of the LMP being made up of Candelillia wax at 74% by weight of the LMP and Sunflower Lecithin at 3% by weight of the LMP. The LMP has a particle size of 200-500 um and is produced using a melt spray congeal process at a temperature a 60-80 C forming an LMP core with the fat soluble vitamins. This LMP core is then added to a pan coater in an amount of 25 parts by weight of the beadlet components, and other vitamins and minerals are layered on top to build up to a beadlet with a particle size of 800-1200 um. Vitamins and minerals include magnesium (as magnesium oxide) 57 parts by weight of the beadlet, Vitamin C in amount of 13 parts by weight of the beadlet. This beadlet is then finalized with a final coating to protect the beadlet, which is a hydroxypropylmethyl cellulose (HPMP) in an amount of 5 parts by weight of the beadlet.

Example 2: Oil and Water Phase Eye Health Beadlet

A beadlet is made using pan coating process, where the starter core contains fat soluble carotenoids provided in the form of an LMP particle which contains—Lutein (20% solution) 22% by weight of the LMP and Vitamin A (as Beta Carotene (30% solution))— 10% by weight of the LMP with the remainder of the LMP being made up of Candelillia wax at 64% by weight of the LMP and Sunflower Lecithin at 4% by weight of the LMP. The LMP has a particle size of 200-500 um and is produced using the melt spray congeal process at a temperature a 60-80 C forming an LMP core with the fat soluble vitamins. This LMP core is then added to a pan coater in an amount of 25 parts by weight of the beadlet components, and other eye health ingredients, such as water soluble eye health ingredient are layered on top of the LMP to build up to a beadlet with a particle size of 800-1200 um. These water soluble eye health ingredient include Vitamin C at 43 parts by weight of the beadlet, Bilberry Extract at 27 parts by weight of the beadlet. This beadlet is then finalized with a final coating to protect the beadlet which is a hydroxypropylmethyl cellulose (HPMP) in an amount of 5 parts by weight of the beadlet.

These and other modifications and variations to the present disclosure may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed:

1. A composition comprising:
a plurality of particles, wherein each of the plurality of particles comprises a core having a lipid matrix with an active ingredient dispersed therein, wherein the active ingredient comprises a fat-soluble active ingredient and at least one outer layer disposed on the core, wherein the fat-soluble active ingredient comprises one or more carotenoids and wherein the at least one outer layer comprises at least one second active ingredient layer.

2. The composition of claim 1, wherein the active ingredient comprises from about 10% to about 60% by weight of the core.

3. The composition of claim 1, wherein the one or more carotenoids are selected from the group consisting of lutein, astaxanthin, zeaxanthin, alpha-carotene, beta-carotene, cryptoxanthin, lycopene, and mixtures thereof.

4. The composition of claim 1, wherein the core is solid at ambient temperature.

5. The composition of claim 1, wherein the core has a mean diameter ranging from about 40 µm to about 3000 µm.

6. The composition of claim 1, wherein the lipid matrix comprises at least one low flow point excipient and at least one high flow point excipient.

7. The composition claim 1, wherein the at least one outer layer comprises one or more adhesives and one or more active ingredients.

8. The composition of claim 1, wherein the at least one second active ingredient comprises one or more fat-soluble vitamins or minerals, one or more water soluble vitamins or minerals, and combinations thereof.

9. The composition of claim 1, wherein the core comprises about 5% to about 60% by weight of the plurality of particles.

10. The composition of claim 1, wherein the one or more particles comprise an average diameter of from about 0.5 mm to about 1.5 mm.

11. The composition of claim 1, further comprising an outermost layer comprised of a coating material for sealing each of the plurality of particles.

12. The composition of claim 1, wherein the plurality of particles further contain one or more adjuvants chosen from anti-adherents, binders, coatings, colors, disintegrants, fillers, flavoring agents, glidants, lubricants, preservatives, sorbents, sweeteners, vehicles, vitamins, and the like.

* * * * *